(12) United States Patent
Sinnhuber

(10) Patent No.: US 6,530,596 B2
(45) Date of Patent: Mar. 11, 2003

(54) STEERING DEVICE FOR A VEHICLE, ESPECIALLY FOR A MOTOR VEHICLE, HAVING AN AIRBAG MODULE

(75) Inventor: Ruprecht Sinnhuber, Gifhorn (DE)

(73) Assignee: Volkswagen AG, Wolfburg/Fallersleben (DE)

( * ) Notice: Subject to any disclaimer, the term of this patent is extended or adjusted under 35 U.S.C. 154(b) by 0 days.

(21) Appl. No.: 09/808,761

(22) Filed: Mar. 15, 2001

(65) Prior Publication Data

US 2001/0054812 A1 Dec. 27, 2001

(30) Foreign Application Priority Data

Mar. 15, 2000 (DE) .......................................... 100 12 093

(51) Int. Cl.⁷ .............................................. B60R 21/16
(52) U.S. Cl. ...................................................... 280/731
(58) Field of Search .............................. 280/731, 728.1, 280/728.2, 728.3, 740

(56) References Cited

U.S. PATENT DOCUMENTS

| | | | | |
|---|---|---|---|---|
| 5,570,901 A | * | 11/1996 | FyRainer | 280/730.1 |
| 5,609,356 A | * | 3/1997 | Mossi | 280/728.1 |
| 5,655,789 A | * | 8/1997 | Kreuzer | 280/731 |
| 5,772,241 A | * | 6/1998 | Hellig | 280/728.2 |
| 6,170,862 B1 | * | 1/2001 | Hoagland et al. | 280/731 |
| 6,227,571 B1 | * | 5/2001 | Sheng et al. | 280/731 |

FOREIGN PATENT DOCUMENTS

| | | |
|---|---|---|
| DE | 42 41 108 | 6/1993 |
| DE | 197 26 878 | 10/1998 |
| DE | 197 24 492 | 12/1998 |
| DE | 197 33 896 | 2/1999 |
| DE | 197 59 182 | 5/1999 |
| DE | 198 04 655 | 11/1999 |
| DE | 299 12 825 | 12/1999 |
| DE | 199 31 815 | 1/2000 |

* cited by examiner

Primary Examiner—Paul N. Dickson
Assistant Examiner—Faye M. Fleming
(74) Attorney, Agent, or Firm—Kenyon & Kenyon

(57) ABSTRACT

A steering device is configured for a vehicle, which includes a steering column, a steering-wheel hub and a steering wheel, the steering-wheel hub including an openable cover, behind which an airbag module containing a gas generator and an airbag is disposed. In the activated state of the airbag module, the cover unblocking an airbag outlet, through which the airbag can be inflated in front of the steering wheel. The cover is coupled to at least one pulling device, which can be operated by a pyrotechnic actuator in the form of a cylinder-piston unit, the gas generator forming the piston, which is supported so as to be moveable from a neutral position into a working position, in a cylinder region of the steering-wheel hub and/or of the steering column, which acts as a cylinder. The at least one pulling device is indirectly and/or directly connected to the gas generator so that, in response to the gas generator being displaced in the cylinder region, a tensile force can be applied to the at least one pulling device, so that the pulling device transfers the cover from its covering position into its open position, in order to open the airbag outlet.

28 Claims, 3 Drawing Sheets

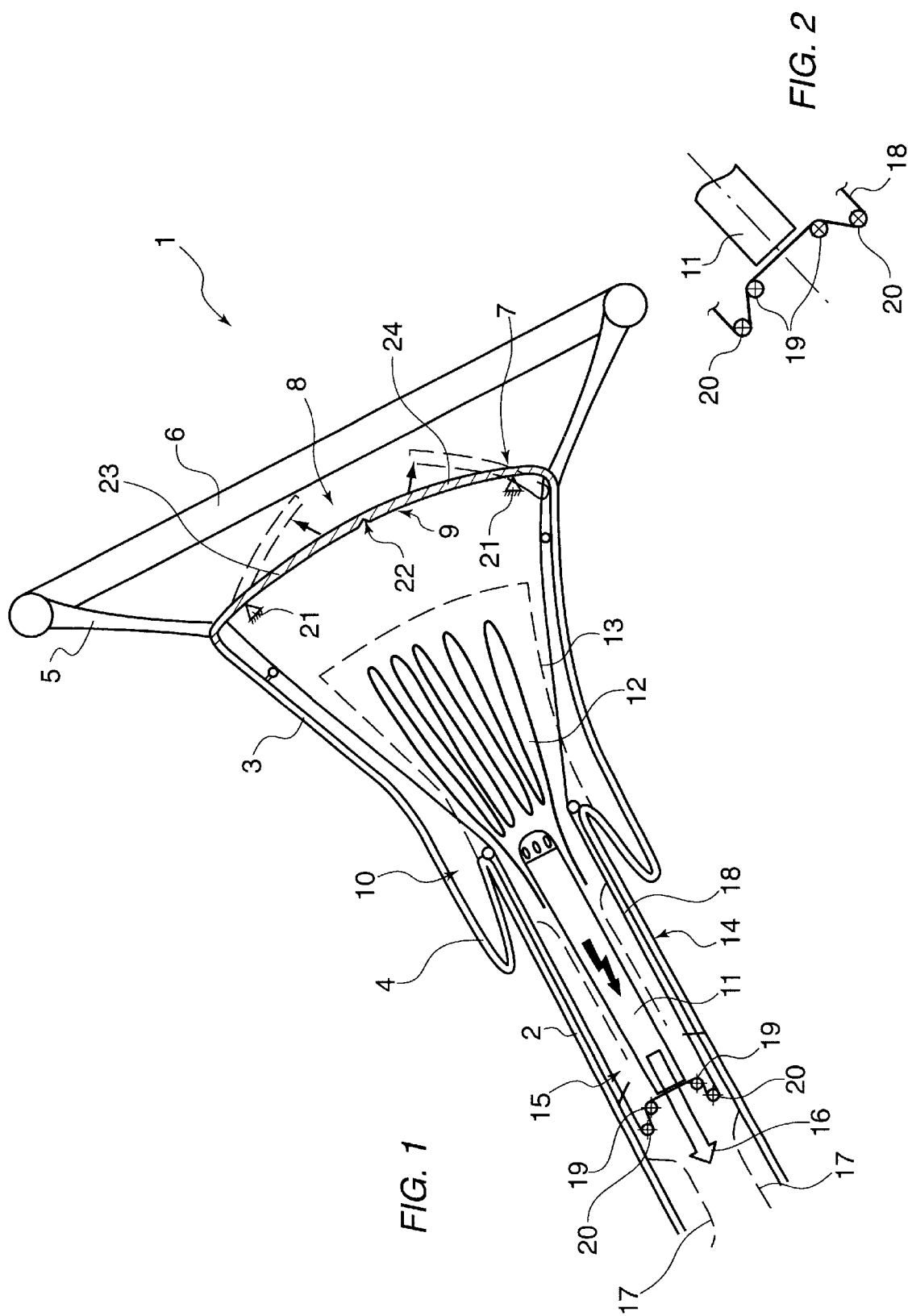

STEERING DEVICE FOR A VEHICLE, ESPECIALLY FOR A MOTOR VEHICLE, HAVING AN AIRBAG MODULE

FIELD OF THE INVENTION

The present invention relates to a steering device for a vehicle, especially for a motor vehicle, having an airbag module.

BACKGROUND INFORMATION

A conventional steering device for a vehicle that has an airbag module, especially for a motor vehicle, includes a steering column having an extreme steering-wheel hub, to which the steering wheel is mounted. The steering wheel hub is preferably designed to be cup-shaped and includes an outlet wall having an openable cover, behind which the airbag module is disposed. The airbag module includes a gas generator and an airbag. In the activated state of the airbag module, the cover unblocks an airbag outlet, through which the airbag can be inflated in front of the steering wheel.

The covers are specifically in the form of flaps and lids, which are broken at prenotched edge slots of a cover, by a triggered airbag and the pressure building up therein, and which swing into the interior of the vehicle. In order to prevent such lids from flying uncontrollably into the passenger compartment, catch bands may be used, which restrain the flaps or lids. This manner of opening valves by means of the airbag can undesirably hinder the inflation and unfolding operation, particularly in connection with flaps that are restrained by catch bands.

Steering devices are special designs constructed in a complicated manner, so that, for example, airbag modules which are developed for an instrument panel of a vehicle, as are described, for example, in German Published Patent Application Nos. 199 31 815, 299 12 825, 197 26 878, 197 50 182 and 197 33 896, and in which a tensile force is applied to an airbag-module cover by a pyrotechnically activatable cable line to unblock an airbag outlet, cannot easily be applied to steering devices. In the case of such airbag modules developed for an instrument panel of a vehicle, one must especially consider that, in the rearward direction, i.e. in the direction of the engine compartment, there is only a small space for displacing individual component parts. In addition, the design of a steering device requires that it be constructed in an extremely compact manner since, in contrast to an instrument panel, considerably less installation space is available.

It is an object of the present invention to provide a steering device for a vehicle, especially for a motor vehicle, having an airbag module, in which the steering device can be manufactured easily and inexpensively and in which it is possible to open the cover in the region of the steering-wheel hub, in a functionally reliable and rapid manner, in order to unblock the airbag outlet.

SUMMARY

According to the present invention, the cover is connected to at least one pulling means, which can be actuated by a pyrotechnic actuator that is in the form of a cylinder-piston unit. In this cylinder-piston unit, the gas generator constitutes the piston, which is supported in a steering-wheel-hub cylinder region acting as a cylinder and/or steering-column cylinder region acting as a cylinder, so as to be moveable from a neutral position to a working position. The at least one pulling device is indirectly and/or directly connected to the gas generator in such a manner, that, in response to the gas generator being shifted in the cylinder region, a tensile force can be applied to the at least one pulling device so that the pulling device transfers the cover from its covering position into its open position for unblocking the airbag outlet.

Such a device may be manufactured easily and inexpensively, since the steering-device and airbag-module components and component parts required, namely the normally cylindrical wall region of the steering column and/or of the steering-wheel hub, used as the cylinder region, as well as the gas generator used as the piston, may also function to open the cover. Such an integration of functions in a steering device allows a necessary, compact method of construction to be easily implemented. In addition, the simple, preferably linear movement of the gas generator allows a simple design using longitudinal guide elements and permits the cover to be opened in a functionally reliable and rapid manner.

In one embodiment of the present invention, the at least one pulling device is formed by the airbag having at least one airbag-subsection fastened to the cover so that, in response to the gas generator being moved in the cylinder region, e.g., in the direction away from the cover, a tensile force may be applied to the at least one airbag-subsection. In this manner, the cover is transferred into its open position, e.g., into an area behind the outlet wall, and the airbag is subsequently inflated through the airbag outlet. Therefore, the airbag also functions to open the cover, whereby the number of component parts is advantageously reduced further, since separate pulling devices are not required for opening the cover. In addition, it is simple to manufacture an airbag folded in such a manner, so that, on the whole, such a design can be produced very inexpensively.

In an alternative embodiment of the present invention, the pulling device is formed by a cable line, which is guided over fixed deflection points, around the airbag module, to the cover so that, in response to the gas generator being moved in the cylinder region, e.g., in a direction away from the cover, a tensile force can be applied to the cable line, so that the tensile force transfers the cover into its open position, and the airbag subsequently exits through the airbag outlet, and can be inflated. Using such a design, the tensile force acting on the cover, and therefore the opening kinematics, may be adapted individually to the respective mounting situation, by the number, the type, and the size of the deflection points. In particular, the tensile force necessary to open the cover can be reduced by deflecting the cable line over several deflection pulleys. This arrangement allows the airbag module to be activated in a concerted and controlled manner and allows the cover to be opened in a functionally reliable and rapid manner.

In another embodiment of the present invention, a first, stationary deflection point is mounted at each of the two sides of a lower gas-generator end, so as to be set apart from the lower gas-generator end. A subsection of the cable line is guided around these first, stationary deflection points in such a manner, that this subsection runs approximately horizontally, and is preferably disposed directly adjacently to the lower gas-generator end. The first, stationary deflection points are set apart from each other so that the gas generator may be moved between and through these deflection points while pulling the cable line along. Such a design allows the cover to be opened rapidly, since a tensile force may already be applied immediately to the cable line, as the gas generator begins to move.

Another embodiment of the present invention provides for each of the first, stationary deflection points having a second, stationary deflection point assigned to it, which is shifted further to the outside, in relation to the lower gas-generator end, and is lower than the respective, first stationary deflection point. The second, stationary deflection points may be at the same level relative to the bottom end of the gas generator. The cable line extending from the first, stationary deflection points is then guided around the respective, second, stationary deflection points, and possibly over additional, stationary deflection points, in the direction of the cover. Such a design allows the cable to be guided in an advantageous manner, while a tensile force, which can be set precisely, acts on the cover.

The cable line may be guided upwardly by each of the free cable ends on the two sides of the airbag module, in the direction of the cover and may be secured in position in an edge area at the extremity. In response to the gas generator being shifted in a direction away from the cover, between and through the two first, stationary deflection points, while pulling the cable line along, a tensile force acts on the two cable ends so that they, together with respective subsections of the cover, may swivel outwardly, about a stationary, hinged bearing, in the direction of the outlet wall, in order to open the airbag outlet. Particularly in conjunction with a single-stage gas generator, this rapidly opens the airbag outlet for an airbag to exit through. Particularly in conjunction with a two-stage gas generator, in which the first stage is merely used to displace the gas generator, the cable ends may also be fastened to the cover so that they are swiveled inwardly, into the hub region. Then, the second stage is only triggered after the cover swings in.

In the neutral position, the airbag may be accommodated in a separate airbag cup, which is secured in position, near the steering-wheel hub and/or steering column, set apart from it. In this case, the cable line may be guided in the region between the airbag cup and a side of the steering-wheel hub and/or of the steering column, whereby the airbag is separated from the cable line, and they cannot interfere with each other.

In an additional embodiment of the present invention, the gas generator used as a piston and having a pre-chamber housing, which is in the form of a cylinder region, and is connected to the steering-wheel hub and/or steering column or integrally formed with it, is supported so as to be moveable in the direction of the cover. After being activated, the gas generator injects gas, via exhaust ports, into the prechamber housing, which is closed in a gas-tight manner, and is opposite to the cover, and the gas generator builds up a displacement pressure for moving the gas generator into the working position. Using such a design, the gas generator, and therefore the airbag, is already moved in the airbag-outlet direction, i.e., in the unfolding and inflation direction, at the start of the activation. This movement in the direction of the cover is simultaneously used to open the cover.

The at least one pulling device is connected to the gas generator, via a pulling-direction deflector, so that the cover can be moved behind the outlet wall by the gas generator, in a direction that is approximately opposite to that of the gas generator, which can move in the direction of the cover.

In still another embodiment of the present invention, the airbag can only be inflated in the shifted working position of the gas generator, via a gas connection, in response to the gas generator being activated. This arrangement achieves a high opening reliability, since, after the gas generator is activated, the escaping gas is initially used for moving the gas generator only, in order to open the cover. Then, the gas that continues to escape is only subsequently used to inflate the airbag, after a time delay, in the case of an already open airbag outlet.

In one embodiment of the present invention, at least one overflow opening may be positioned at the prechamber housing, in the sliding path of the gas generator, e.g., near the shifted working position of the gas generator, the overflow opening producing a gas connection to the airbag after the gas generator travels past the overflow opening. Therefore, prior to the overflow opening being reached, there is still no gas connection between the gas generator and the airbag, so that, after its activation, the gas generator is initially only used as an actuator for reliably opening the cover, and only subsequently used to inflate the airbag.

The gas generator may include radial blow-off outlets, the moveable gas generator and the moveable airbag module being guided along the displacement path in a gas-tight manner, in the pre-chamber housing, by at least one sealing element. This arrangement achieves a high functional reliability of the opening actuator.

Rods or tension members may also be used as tension elements. It may be particularly advantageous and inexpensive to provide a cable line as the at least one pulling device, which, starting out from the gas generator, is guided out of the prechamber housing in a gas-tight manner, in the direction opposite to the movement of the gas generator, and over at least two stationary deflection points, around the prechamber housing, to the cover located in front of the prechamber housing, at a distance from it. The cable line is connected there. The engaging movement of the gas generator may deflect the cable line from the original position, in order to generate the opening force for the cover.

A one-stage gas generator may be used as a gas generator, which may be shifted due to the recoiling caused by the discharging gas. However, one embodiment of the present invention provides for the gas generator being a two-stage gas generator, the pyrotechnic actuator being operable in the first generator stage, after the gas generator is activated by a crash sensor, and the airbag being inflatable in the second generator stage, after a time delay.

The cover may be formed by at least one openable airbag flap, which can swivel in or out to the airbag module, the cover being designed to selectively break, and therefore, to selectively open the airbag outlet, using an outer skin that can break at a notch.

An additional safety function results from the fact that a subsection in the region of the steering-wheel hub and/or steering column is designed as a deformation region. For example, such a deformation region may be designed to have an undulated profile and/or to be a type of inverted tube.

BRIEF DESCRIPTION OF THE DRAWINGS

FIG. 1 is a schematic cross-sectional view of a steering device having a first example embodiment of a pyrotechnic opening actuator;

FIG. 2 is an enlarged detail view of the lower end of the gas generator shown in FIG. 1;

DETAILED DESCRIPTION

Figure 3:
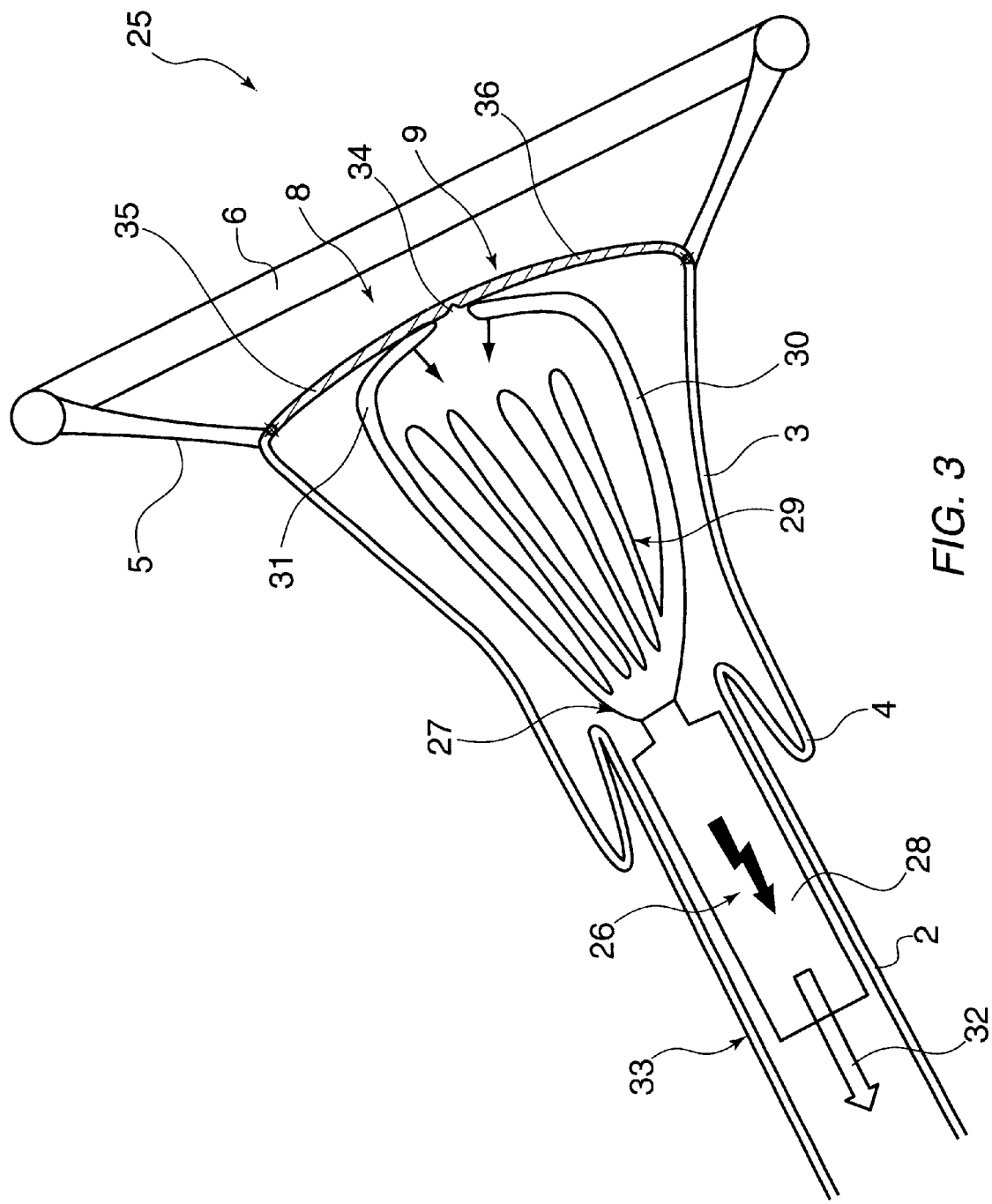
FIG. 3 is a schematic cross-sectional view of a steering device having a second example embodiment of a pyrotechnic opening actuator.

A schematic cross-sectional view through a subsection of a motor-vehicle steering device 1 is illustrated in FIG. 1. The steering device 1 includes a steering column 2, which has a steering-wheel hub 3 on its end. Steering-wheel hub 3 may be designed to be cup-shaped and may include a deformation region in the form of an inverted tube 4, in the transitional region to steering column 2.

A steering wheel 6, which extends around the steering-wheel-hub region in an approximately annular manner, is positioned at steering-wheel hub 3, over steering-wheel spokes 5.

Steering-wheel hub 3 has an outlet wall 7 at the extremity, in which an airbag outlet 8 is covered by a cover 9.

As illustrated in FIG. 1, an airbag module 10, which includes a two-stage gas generator 11 and an airbag 12, is arranged behind cover 9. In the non-activated state illustrated in FIG. 1, airbag 12 is accommodated in a separate airbag cup 13, which is only shown schematically using a dashed line. This airbag cup 13 is disposed in the region of the steering-wheel hub 3 and is secured in position at a distance from a steering-wheel-hub wall region.

Two-stage gas generator 11 is simultaneously a component of a pyrotechnic actuator 14, which is in the form of a cylinder-piston unit, and is for unblocking airbag outlet 8, where two-stage gas generator 11 forms the piston, which is supported so as to be moveable in a steering-column 2 cylinder region 15 acting as a cylinder, from a neutral position illustrated in FIG. 1, in the direction of arrow 16, into a working position, not shown. As illustrated in FIG. 1 by a dashed line, gas generator 11 may be received in a form-locked manner, by guide elements, such as guide plates 17, in cylinder region 15 of steering column 2.

Pyrotechnic actuator 14 also includes a cable line 18 as a pulling device, having a subsection guided around first, stationary deflection points 19, which are disposed on each of the two sides of a lower gas-generator end and which are mounted approximately at the same level in relation to this lower gas-generator end. The cable-line subsection is guided around the first, stationary deflection points in such a manner, that it runs approximately horizontally, and directly adjacently to the lower gas-generator end, as illustrated in FIG. 2, which is a schematic, enlarged detail view of this lower gas-generator region. As shown in FIGS. 1 and 2, the two first, stationary deflection points 19 are set apart from each other so that two-stage gas generator 11 may be moved between and through them, in the direction of arrow 16, while pulling the cable line.

As illustrated in FIGS. 1 and 2, each of the first, stationary deflection points 19 have a second, stationary deflection point 20 assigned to it, each of which is, in relation to the lower gas-generator end, shifted further to the outside, and is lower than the respective, assigned, first stationary deflection point 19. Second, stationary deflection points 20 may be arranged approximately at the same level in relation to the lower end of the gas generator. Cable line 18 extending from first, stationary deflection points 19 is guided around respective, second stationary deflection points 20, along gas generator 11, as well as upwardly, in the region between airbag cup 13 and a steering-wheel-hub wall, in the direction of cover 9. The two free ends of cable line 18 are each secured in position in an extreme edge area of the cover.

In the case of a collision being sensed by a crash sensor, not shown, the crash sensor activates a first generator stage of two-stage gas generator 11, whereby gas generator 11 is shifted in the direction of arrow 16, away from cover 9, between and through the two, stationary deflection points 19, into the working position. During this displacement, the gas generator pulls cable line 18 along, and therefore applies a tensile force to the edge of the cover region, so that cover 9 breaks in a middle cover region, which is only illustrated for purposes of illustration, and is provided with a notch 22. The cover is swiveled about stationary, hinged bearing 21, which is slightly offset to the inside, from the end area on the edge. This is only illustrated in FIG. 1 schematically by a dashed line. The swiveling of cover subsections 23, 24 unblocks airbag outlet 8, so that airbag 12 may be inflated in the second, time-delay-activated generator stage of two-stage gas generator 11 and may be inflated through airbag outlet 8, in front of a vehicle occupant.

In addition to first and second deflection points 19, 20, other deflection points may be provided, which, may be designed, particularly in regard to their dimensioning, so that a selected tensile force acts on cover 9 in response to a shift of gas generator 11.

FIG. 3 is a schematic cross-sectional view of a subsection of steering device 25, which includes another embodiment of a pyrotechnic actuator 26 for unblocking airbag outlet 8. Identical parts shown in FIGS. 1 and 3 are denoted by the same reference numerals.

An airbag module 27 may include a two-stage gas generator 28 and an airbag 29 connected thereto. Gas generator 28 is accommodated in steering column 2 in a form-locked manner, while airbag 29 is accommodated in cup-shaped steering-wheel hub 3, in the neutral position illustrated in FIG. 3. A pulling device for opening cover 9 is formed by airbag 29, where, as illustrated schematically in FIG. 3, the airbag having two airbag subsections 30, 31 is folded and attached to cover 9 so that, in response to gas generator 28 being shifted in the direction of arrow 32, in cylinder region 33 formed by steering column 2, e.g., by triggering a first gas-generator stage, or alternatively by the recoil in response to the gas-generator stage of a one-stage gas generator being activated, a tensile force may be applied to cover 9, via airbag subsections 30, 31 connected to cover 9, so that the cover breaks at a desired breaking location in the form of a notch 34, and its cover flaps 35, 36 are pulled inward into steering-wheel hub 3 to free airbag outlet 8, so that airbag 29 can subsequently emerge unhindered, and be inflated in front of a vehicle occupant, e.g., by triggering a second gas-generator stage.

Figure 4:
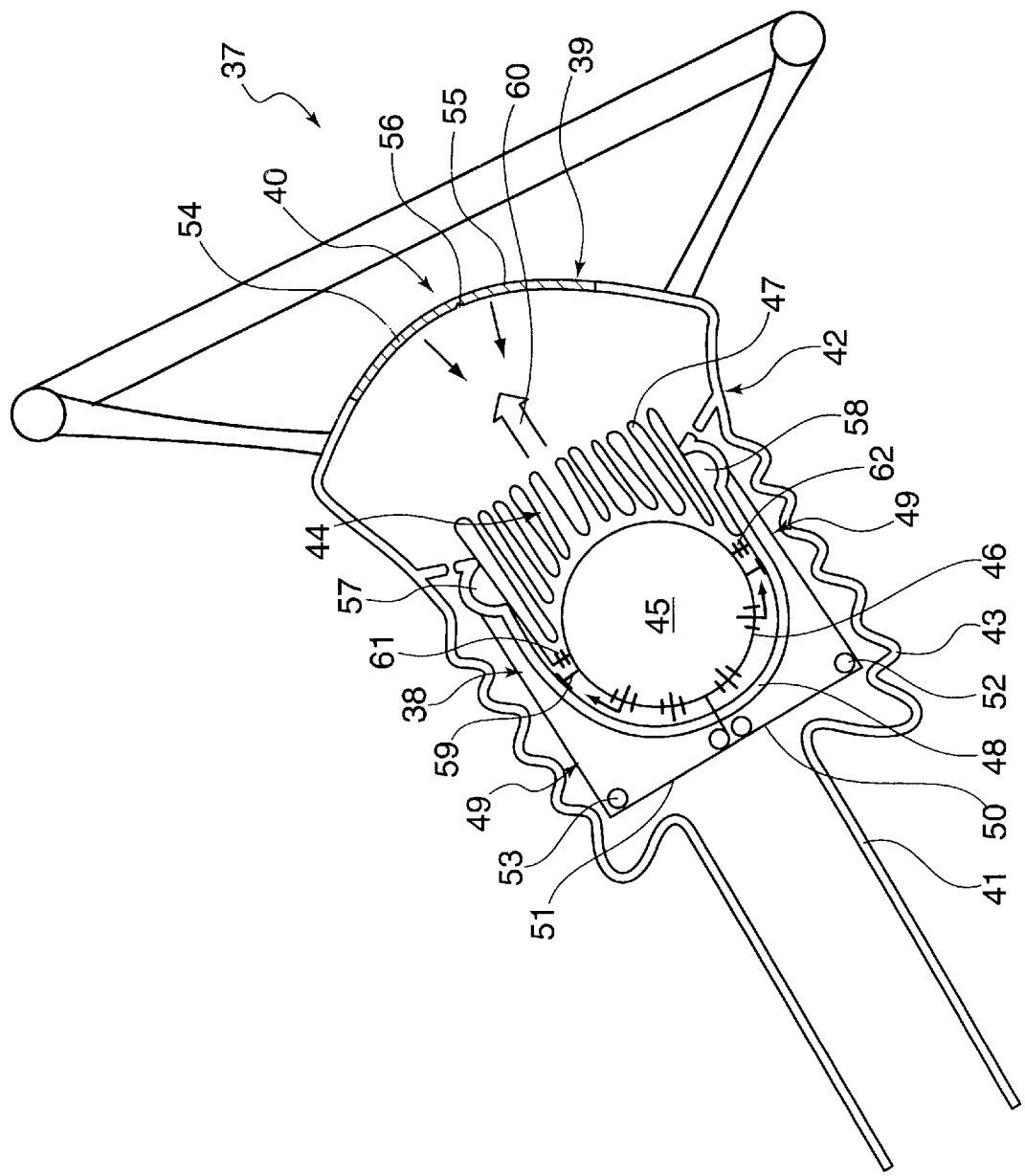
FIG. 4 is a schematic cross-sectional view of a steering device having a third example embodiment of a pyrotechnic opening actuator.

FIG. 4 is a schematic cross-sectional view of a subsection of steering device 37, which shows another embodiment of a pyrotechnic actuator 38 for opening a cover 39, in order to unblock an airbag outlet 40.

Steering device 37 includes a steering column 41, the extremity of which is contiguous to a cup-shaped steering-wheel hub 42, a subsection of steering-wheel hub 42 being designed to have an undulated profile 43. Disposed in steering-wheel hub 42 is an airbag module 44, which includes a two-stage gas generator 45 having radial blow-off outlets 46 and a folded airbag 47 connected to gas generator 45.

Gas generator 45 is a component of pyrotechnic actuator 38 designed as a cylinder-piston unit, gas generator 45 forming the piston moveably supported in a prechamber housing 48, which acts as a cylinder region, and is a component of steering-wheel hub 42.

In addition, pyrotechnic actuator 38 includes a cable line 49 as a pulling device. This cable line 49 includes two pulling cords 50, 51, which, starting from gas generator 45, exit out of prechamber housing 48 in a gas-tight manner. On opposite sides of prechamber housing 48, each of these pulling cords 50, 51 is guided over two stationary deflection points 52, 53, around prechamber housing 48, to cover 39, which is located in front of prechamber housing 48, at a distance from it. The pulling cords are fastened there. Cover 39 also includes two cover flaps 54, 55, which are pivoted at the edge area, so as to swivel, and have a notch 56 as a desired breaking location, in a middle region of cover 39.

Overflow openings 57, 58 are formed on opposite sides, in a front region of prechamber housing 48 near the cover. In addition, gas generator 45 is guided in prechamber housing 48, in a gas-tight manner, using a sealing element 59.

In the event of a collision, a first stage of two-stage gas generator 45 is triggered, whereby gas is injected through blow-off outlets 46, into prechamber housing 48, which is closed in a gas-tight manner by sealing elements 59. The gas pressure building up in this region of prechamber housing 48 moves gas generator 45, and therefore, the entire airbag module 44, in the direction of arrow 60 shown in FIG. 4. By shifting gas generator 45, which is in the form of a piston, in prechamber housing 48, which is in the form of a cylinder region, in the manner of a cylinder-piston unit, the two pulling-cord ends on the side of the gas generator are also moved in the direction of arrow 60, whereby a tensile force is applied to the two pulling-cord ends on the side of the wall cover. This tensile force causes cover 39 to break at notch 56, in response to which cover flaps 54, 55 fold in and unblock airbag outlet 40, while simultaneously providing protection from the edges.

As soon as gas generator 45 having sealing elements 59 is moved into the region of overflow openings 57, 58 after starting out from the neutral position illustrated in FIG. 4, a gas connection to airbag 47 is established via airbag-inlet openings 61, 62 after the gas generator crosses these overflow openings 57, 58. Airbag 47 is inflated by a second stage of gas generator 45 activated at the instant that overflow openings 57, 58 are overrun, and as a result, the airbag exits from airbag outlet 40, into a passenger compartment.

What is claimed is:

1. A steering device for a vehicle, comprising:
   an airbag module, the airbag module including a gas generator and an airbag;
   a steering wheel;
   a steering column, the steering column including an extreme steering-wheel hub, the steering wheel being mounted on the extreme steering-wheel hub, the extreme steering wheel hub having a cup-shaped design and including an outlet wall having an openable cover, the gas generator and the airbag being disposed behind the openable cover, the openable cover unblocking an airbag outlet through which the airbag is inflatable in front of the steering wheel when the airbag module is in an activated state;
   a pyrotechnic actuator, the pyrotechnic actuator including a cylinder-piston unit, the gas generator defining the piston thereof, at least one of the steering-wheel hub and the steering column defining the cylinder thereof, the gas generator being supported in a cylinder region of the at least one of the steering-wheel hub and the steering column so as to be movable from a neutral position into a working position; and
   at least one pulling device coupled to the cover, the at least one pulling device being actuatable by the pyrotechnic actuator;
   wherein the at least one pulling device is connected to the gas generator unit at least one of indirectly and directly so that, in response to the gas generator being shifted in the cylinder region, a tensile force is applied to the at least one pulling device so that the at least one pulling device transfers the cover from a covering position to an open position to unblock the airbag outlet.

2. The steering device according to claim 1, wherein the vehicle is a motor vehicle.

3. The steering device according to claim 1, wherein the at least one pulling device includes at least a portion of the airbag, the airbag being fastened by at least one airbag subsection to the cover so that, in response to the gas generator being shifted in the cylinder region, the tensile force is applied to the at least one airbag subsection, the tensile force transferring the cover to the open position, the airbag subsequently exiting the airbag outlet and being inflatable.

4. The steering device according to claim 3, wherein the gas generator is shifted in the cylinder region in a direction away from the cover.

5. The steering device according to claim 3, wherein the tensile force transfers the cover into the open position into a region disposed behind the outlet wall.

6. The steering device according to claim 1, wherein the pulling device includes a cable line, which is guided over at least one stationary deflection point around the airbag module to the cover;
   and wherein in response to the gas generator being shifted in the cylinder region, the tensile force is applied to the cable line so that the tensile force transfers the cover into the open position, the airbag subsequently exiting the airbag outlet and being inflatable.

7. The steering device according to claim 6, wherein the gas generator is shifted in the cylinder region in a direction away from the cover.

8. A steering device for a vehicle, comprising:
   an airbag module, the airbag module including a gas generator and an airbag;
   a steering wheel;
   a steering column, the steering column including an extreme steering-wheel hub, the steering wheel being mounted on the extreme steering-wheel hub, the extreme steering wheel hub having a cup-shaped design and including an outlet wall having an openable cover, the gas generator and the airbag being disposed behind the openable cover, the openable cover unblocking an airbag outlet through which the airbag is inflatable in front of the steering wheel when the airbag module is in an activated state;
   a pyrotechnic actuator, the pyrotechnic actuator including a cylinder-piston unit, the gas generator defining the piston thereof, at least one of the steering-wheel hub and the steering column defining the cylinder thereof, the gas generator being supported in a cylinder region of the at least one of the steering-wheel hub and the steering column so as to be movable from a neutral position into a working position; and
   at least one pulling device coupled to the cover, the at least one pulling device being actuatable by the pyrotechnic actuator;
   wherein the at least one pulling device is connected to the gas generator unit at least one of indirectly and directly so that, in response to the gas generator being shifted in the cylinder region, a tensile force is applied to the at feast one pulling device so that the at least one pulling device transfers the cover from a covering position to an open position to unblock the airbag outlet;

wherein the pulling device includes a cable line, which is guided over at least one stationary deflection point around the airbag module to the cover;

wherein in response to the gas generator being shifted in the cylinder region, the tensile force is applied to the cable line so that the tensile force transfers the cover into the open position, the airbag subsequently exiting the airbag outlet and being inflatable; and wherein the gas generator includes a lower end, the lower end of the gas generator including two sides, a first stationary deflection point being provided on each of the two sides of the lower end of the gas generator and being spaced apart from the lower end of the gas generator, a subsection of the cable line being guided around the first, stationary deflection points so that the subsection extends substantially horizontally and is disposed directly adjacent to the lower end of the gas generator, the first stationary deflection points being spaced apart from each other so that the gas generator is movable therebetween and therethrough while pulling the cable line.

9. The steering device according to claim 8, wherein a second stationary deflection point corresponds to each of the first stationary deflection points, each second stationary deflection point being arranged further to the outside relative to the lower end of the gas generator and lower than the corresponding first stationary deflection point, the cable line extending from the first stationary deflection points being guided around the corresponding second stationary deflection points.

10. The steering device according to claim 9, wherein the second stationary deflection points are arranged at a same level relative to the lower end of the gas generator.

11. The steering device according to claim 9, wherein the cable line is guided around additional stationary deflection points in a direction of the cover.

12. A steering device for a vehicle, comprising:

an airbag module, the airbag module including a gas generator and an airbag;

a steering wheel;

a steering column, the steering column including an extreme steering-wheel hub, the steering wheel being mounted on the extreme steering-wheel hub, the extreme steering wheel hub having a cup-shaped design and including an outlet wall having an openable cover, the gas generator and the airbag being disposed behind the openable cover, the openable cover unblocking an airbag outlet through which the airbag is inflatable in front of the steering wheel when the airbag module is in an activated state;

a pyrotechnic actuator, the pyrotechnic actuator including a cylinder-piston unit, the gas generator defining the piston thereof, at least one of the steering-wheel hub and the steering column defining the cylinder thereof, the gas generator being supported in a cylinder region of the at least one of the steering-wheel hub and the steering column so as to be movable from a neutral position into a working position; and at least one pulling device coupled to the cover, the at least one pulling device being actuatable by the pyrotechnic actuator;

wherein the at least one pulling device is connected to the gas generator unit at least one of indirectly and directly so that, in response to the gas generator being shifted in the cylinder region, a tensile force is applied to the at least one pulling device so that the at least one pulling device transfers the cover from a covering position to an open position to unblock the airbag outlet;

wherein the pulling device includes a cable line, which is guided over at least one stationary deflection point around the airbag module to the cover;

wherein in response to the gas generator being shifted in the cylinder region, the tensile force is applied to the cable line so that the tensile force transfers the cover into the open position, the airbag subsequently exiting the airbag outlet and being inflatable; and wherein each tree end of the cable line is guided towards a respective side of the airbag module and upwardly in a direction of the cover, each free end of the cable line being secured in position in an extreme edge area of the cover; and wherein, in response to the gas generator being shifted in a direction away from the cover between and through the first stationary deflection points while pulling the cable line, the tensile force acts on the free ends of the cable line so that the free ends swivel outwardly with a cover subsection about a stationary hinged bearing in a direction away from the outlet wall to open the airbag outlet.

13. The steering device according to claim 6, wherein in the neutral the airbag is provided in a separate airbag cup, the separate airbag cup being secured in position in a region of at least one of the steering-wheel hub and the steering column and spaced apart therefrom so that the cable line is guided in a region between the airbag cup and a wall of the at least one of the steering-wheel hub and the steering column.

14. The steering device according to claim 1, wherein the gas generator defines a piston supported in a prechamber housing defining a cylinder region and is at least one of connected to and formed integrally with at least one of the steering-wheel hub and the steering column, the gas generator being movable in a direction of the cover so that after activation, the gas generator injects gas through at least one exhaust port into the prechamber housing, the prechamber housing being disposed opposite to the cover, the gas generator generating a displacement pressure to shift the gas generator into the working position.

15. The steering.device according to claim 14, wherein the prechamber housing is gas-tight.

16. The steering device according to claim 14, further comprising a pulling-direction deflector, the at least one pulling device being connected to the gas generator via the pulling-direction deflector so that the gas generator is movable in a direction of the cover and allows the cover to move substantially in an opposite direction behind the outlet wall.

17. The steering device according to claim 14, further comprising a gas connection, wherein in response to the gas generator being activated, the airbag is inflatable through the gas connection when the gas generator has been shifted to the working position.

18. The steering device according to claim 14, wherein the prechamber housing includes at least one overflow opening in a sliding path of the gas generator, a gas connection to the airbag being defined after the overflow opening is overrun by the gas generator.

19. The steering device according to claim 18, wherein the at least one overflow opening is disposed in a region of the working position of the gas generator.

20. The steering device according to claim 14, wherein the gas generator includes at least one radial blow-off outlet.

21. The steering device according to claim 14, further comprising at least one sealing element, at least one of the gas generator and the airbag module being displaceably guidable in the prechamber housing in a gas-tight manner along a sliding path in accordance with the at least one sealing element.

22. The steering device according to claim 14, wherein the pulling device includes at least one cable line, the at least one cable line extending from the prechamber housing in a gas-tight manner in a direction opposite to a direction of movement of the gas generator, the at least one cable being guided over at least two stationary deflection points around the prechamber housing to the cover located in front of the prechamber housing and at a distance therefrom, the at least one cable line being connected to the cover, the cable line being deflectable from an original position by the movement of the gas generator to generate an opening force to open the cover.

23. The steering device according to claim 1, wherein the gas generator includes a two-stage generator, the pyrotechnic actuator being operable in a first generator stage after being activated by a crash sensor and the airbag being inflatable in a second generator stage after a time delay.

24. The steering device according to claim 1, wherein the cover includes at least one openable airbag flap, the at least one openable airbag flap being swivelable at least one of inwardly and outwardly.

25. The steering device according to claim 1, wherein the cover includes an outer skin, which is openable at a notch.

26. The steering device according to claim 1, wherein the airbag is aligned in a direction of the cover and the airbag module is movable.

27. The steering device according to claim 1, wherein a subsection of the region of the at least one of the steering-wheel hub and the steering column includes a deformation region.

28. The steering device according to claim 27, wherein the deformation region includes at least one of an undulated profile and an inverted tube.

* * * * *